United States Patent [19]
Nakayama et al.

[11] Patent Number: 5,723,914
[45] Date of Patent: Mar. 3, 1998

[54] DEVICE FOR PREVENTING AN ELECTRICAL EQUIPMENT FROM RE-POWERING AFTER RECOVERY OF SERVICE INTERRUPTION

[75] Inventors: Eiji Nakayama; Shigeru Shinohara; Masateru Niyada, all of Hitachinaka, Japan

[73] Assignee: Hitachi Koki Co., Ltd., Tokyo, Japan

[21] Appl. No.: 638,049

[22] Filed: Apr. 26, 1996

[30] Foreign Application Priority Data

Apr. 28, 1995 [JP] Japan .................... 7-105252

[51] Int. Cl.$^6$ .................................. H01H 47/00
[52] U.S. Cl. .............. 307/125; 307/130; 307/139
[58] Field of Search ........................... 307/125, 126, 307/131, 130, 139, 140, 59, 60, 78, 86

[56] References Cited

U.S. PATENT DOCUMENTS 4,415,943  11/1983  Wortman ............................. 361/22
5,424,894  6/1995  Briscall et al. ...................... 361/45

*Primary Examiner*—William M. Shoop, Jr.
*Assistant Examiner*—Jonathan S. Kaplan
*Attorney, Agent, or Firm*—Sughrue, Mion, Zinn, Macpeak & Seas, PLLC

[57] ABSTRACT

Re-powering an electrical equipment after recovery of service interruption is prevented if the power switch of the electrical equipment stays in ON position. During a transit period of time just after recovery of service interruption, the detection voltage from a post-voltage detection circuit is set to exceed the detection voltage from a pre-voltage detection circuit. In this condition, a photo triac connected in series to the power switch is rendered non-conductive so that the electrical equipment will not be energized.

9 Claims, 2 Drawing Sheets

DEVICE FOR PREVENTING AN ELECTRICAL EQUIPMENT FROM RE-POWERING AFTER RECOVERY OF SERVICE INTERRUPTION

BACKGROUND OF THE INVENTION

1. Field of the Invention

The present invention relates generally to a security device for use in electrical equipment for not powering the electrical equipment even if the electrical equipment is supplied with power under the condition that the power switch of the electrical equipment stays in ON state. More particularly, the invention relates to a re-powering prevention device for preventing an electrical equipment from being powered after recovery of service interruption.

2. Description of the Prior Art

A powered electrical equipment will turn off at the time of service interruption. If the power switch stays in ON state, the electrical equipment will again be powered after recovery of service interruption. Re-powering electrical equipments under such a situation is dangerous depending on the kind of electrical equipment, such as drilling machine. To prevent re-powering of the electrical equipment after recovery of service interruption, it has been proposed to use a self-holding relay.

However, relays are large in capacity because their contacts perform open and closure of a power circuit. Therefore, the use of a relay in a small-size electrical equipment is not appropriate. Further, the service life of such a relay is short because its contacts open and close the power circuit. Therefore, the electrical equipments incorporating the relay is also short in service life.

SUMMARY OF THE INVENTION

In view of the foregoing, it is an object of the present invention to provide a security device that can be used extensively for various kinds of electrical equipment.

Another object of the present invention is to provide a security device having a long service life.

To achieve the above and other objects, there is provided a security device for an electrical equipment having a power switch. The electrical equipment is connected to a power source in use. The security device includes a first voltage detection circuit that is operable under a first condition when the electrical equipment is supplied with power from the power source. The first voltage detection circuit detects a voltage of the power source and outputs a first detection voltage. The security device further includes a second voltage detection circuit that is operable under a second condition when the electrical equipment is supplied with power from the power source and when the power switch is turned on to allow the electrical equipment to be powered by the power source. The second voltage detection circuit detects a voltage of the power source and outputs a second detection voltage. A comparator is connected to the first voltage detection circuit to receive the first detection voltage and also connected to the second voltage detection circuit to receive the second detection voltage. The comparator compares the first detection voltage with the second detection voltage and outputs a comparison result. Control means are further provided for controlling the electric equipment so as not to be powered by the power source in response to the comparison result obtained after interruption of power supply and under the second condition. Interruption of power supply results from service interruption and also from disconnection of the electrical equipment from the power source.

The comparison result is a binary signal having a first level and a second level wherein the comparison result takes the first level when the second condition occurs following the first condition and the second level when the second condition occurs after the interruption of power supply.

Preferably, the first voltage detection circuit includes a first integrating circuit consisting of a first resistor and a first capacitor connected in series across the power source, and the second voltage detection circuit includes a second integrating circuit consisting of a second resistor and a second capacitor connected in series across the power source. The first integrating circuit has a first time constant larger than the time constant of the second integrating circuit. The first voltage detection circuit outputs a voltage across the first capacitor as the first detection voltage, and the second voltage detection circuit outputs a voltage across the second capacitor as the second detection voltage.

According to another aspect of the invention, there is provided a security device for an electrical equipment having a power switch, wherein the electrical equipment is connected to a power source in use. The device includes a first status detection circuit and a second status detection circuit. The first status detection circuits detects a first status in which the electrical equipment is supplied with power from the power source, and outputs a first detection signal indicative of the first status. The second status detection circuit detects a second status in which the electrical equipment is supplied with power from the power source and the power switch is turned on to allow the electrical equipment to be powered by the power source, and outputs a second detection signal indicative of the second status. Switching means is connected in series to the power switch and is selectively rendered ON or OFF according to a combination of the first detection signal and the second detection signal, wherein the switching means is rendered OFF when the first detection signal and the second detection signal are output simultaneously. The switching means is rendered ON when the second detection signal is output following the first detection signal.

BRIEF DESCRIPTION OF THE DRAWINGS

The particular features and advantages of the invention as well as other objects will become more apparent from the following description taken in connection with the accompanying drawings, in which.

DETAILED DESCRIPTION OF THE PREFERRED EMBODIMENTS

A preferred embodiment of the present invention will be described with reference to the accompanying drawings.

Figure 1:
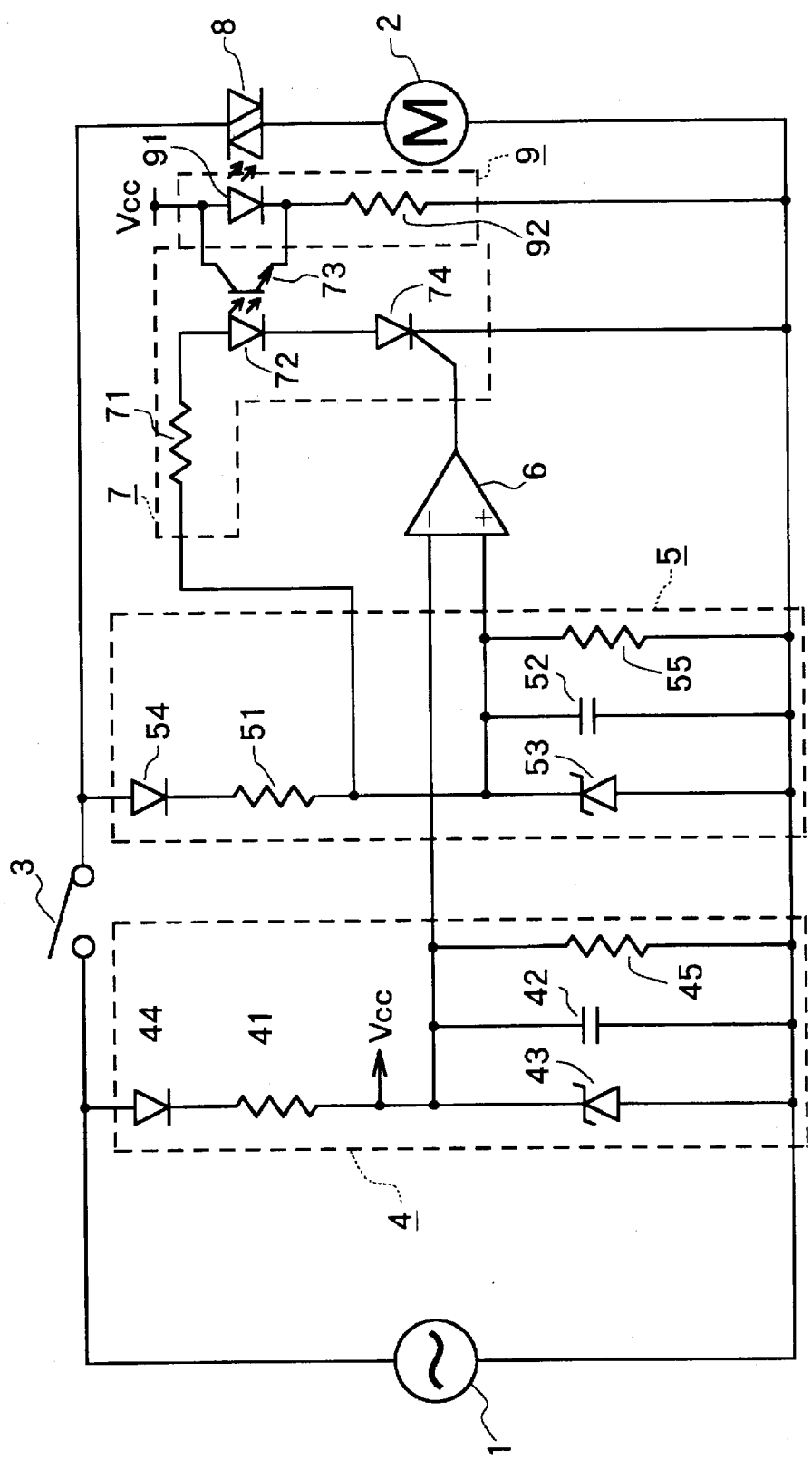
FIG. 1 is a circuit diagram showing a re-powering prevention device according to an embodiment of the present invention.

FIG. 1 is a circuit diagram of a re-powering prevention device incorporated in an electrical equipment. In use, the electrical equipment is connected to a power source 1 as shown in FIG. 1. The electrical equipment has a motor 2 and a power switch 3. The motor 2 is connected to the A.C. power source 1 via the power switch 3 so that the motor 2 is not energized unless the power switch 3 is rendered ON after connection of the electrical equipment to the power source 1. In a feeding path to the motor 2, a photo triac 8 is connected in series to the power switch 3.

A pre-voltage detection circuit 4 is connected across the A.C. power source 1 and a post-voltage detection circuit 5 is connected in parallel to the pre-voltage detection circuit 4. The pre-voltage detection circuit 4 is provided in a pre-position with respect to the power switch 3 and the post-voltage detection circuit 5 is provided in a post-position with respect to the power switch 3, so that the pre-voltage detection circuit 4 detects the voltage of the power source 1 when the electrical equipment is connected to the power source 1 and the post-voltage detection circuit 5 detects the voltage of the power source 1 when the electrical equipment is connected to the power source 1 and when the power switch 3 is rendered ON.

More specifically, the pre-voltage detection circuit 4 includes a diode 44, a resistor 41 and a Zener diode 43 serially connected across the power source 1. The pre-voltage detection circuit 4 further includes a capacitor 42 and a discharge resistor 45 both connected in parallel to the Zener diode 43. The resistor 41 and the capacitor 42 form an integration circuit having a time constant $T_1$. Similarly, the post-voltage detection circuit 5 includes a series connection of a diode 54, a resistor 51 and a Zener diode 53 together with a capacitor 52 and a discharge resistor 55. The latter two are connected in parallel to the Zener diode 53. The resistor 51 and the capacitor 52 also form an integration circuit having a time constant $T_2$ smaller than the time constant $T_1$. The Zener diodes 43 and 53 are so selected that the Zener voltage of the Zener diode 43 is greater than that of the Zener diode 53. The pre-voltage detection circuit 4 outputs a voltage developed across the capacitor 42 and the post-voltage detection circuit 5 outputs a voltage developed across the capacitor 52.

A comparator 6 is connected to the outputs of the pre- and post-voltage detection circuits 4 and 5. The comparator 6 has an inverting input terminal connected to the output of the pre-voltage detection circuit 4 and a non-inverting input terminal connected to the output of the post-voltage detection circuit 5. The comparator 6 outputs a comparison signal upon comparing the output from the pre- and post-voltage detection circuits 4 and 5. The comparison signal is at a logical "0" level when the output from the pre-voltage detection circuit 4 is greater than the output from the post-voltage detection circuit 5 whereas the comparison signal raises to a logical "1" level when the output from the post-voltage detection circuit 5 is greater than the output from the pre-voltage detection circuit 4.

A disabling circuit 7 is connected to the output of the comparator 6, which includes a resistor 71, a light emitting element 72 and an SCR 74 connected in series in the stated order. One end of the resistor 71 is connected to a juncture point between the resistor 51 and the capacitor 52 and the cathode of the SCR 74 is connected to ground so that the voltage developed across the capacitor 52 is applied across the disabling circuit 7. The SCR 74 has a gate connected to the output of the comparator 6. The disabling circuit 7 further includes a light receiving element 73 which is paired with the light emitting element 72. That is, the light receiving element 73 is disposed to receive the light emitted from the light emitting element 72. When the SCR 74 is rendered conductive and so the light emitting element 72 emits light, the light receiving element 73 is rendered conductive and outputs a disabling signal. On the other hand, when the SCR 74 is rendered non-conductive and so no light is emitted from the light emitting element 72, the light receiving element 73 is rendered non-conductive and outputs an enabling signal.

A driving circuit 9 is connected to the output of the disabling circuit 7, which includes a series connection of a light emitting element 91 and a resistor 92. The driving circuit 9 is connected to a voltage source $V_{cc}$. The capacitor 42 is used as the voltage source $V_{cc}$. The voltage source $V_{cc}$ provides a constant voltage regardless of the voltage fluctuation of the power source 1 due to the provision of the Zener diode 43. The light emitting element 91 is connected across the light receiving element 73. In response to the enabling signal, the light emitting element 91 emits light onto the photo triac 8 to thereby render the photo triac 8 conductive. On the other hand, when the disabling signal is output from the disabling circuit 7, the light emitting element 91 is short-circuited by the light receiving element 73 and therefore no light is emitted from the light emitting element 9. In this case, the photo triac 8 is rendered non-conductive. The light emitting element 91 and the photo triac 8 constitute a solid-state relay.

Figure 2:
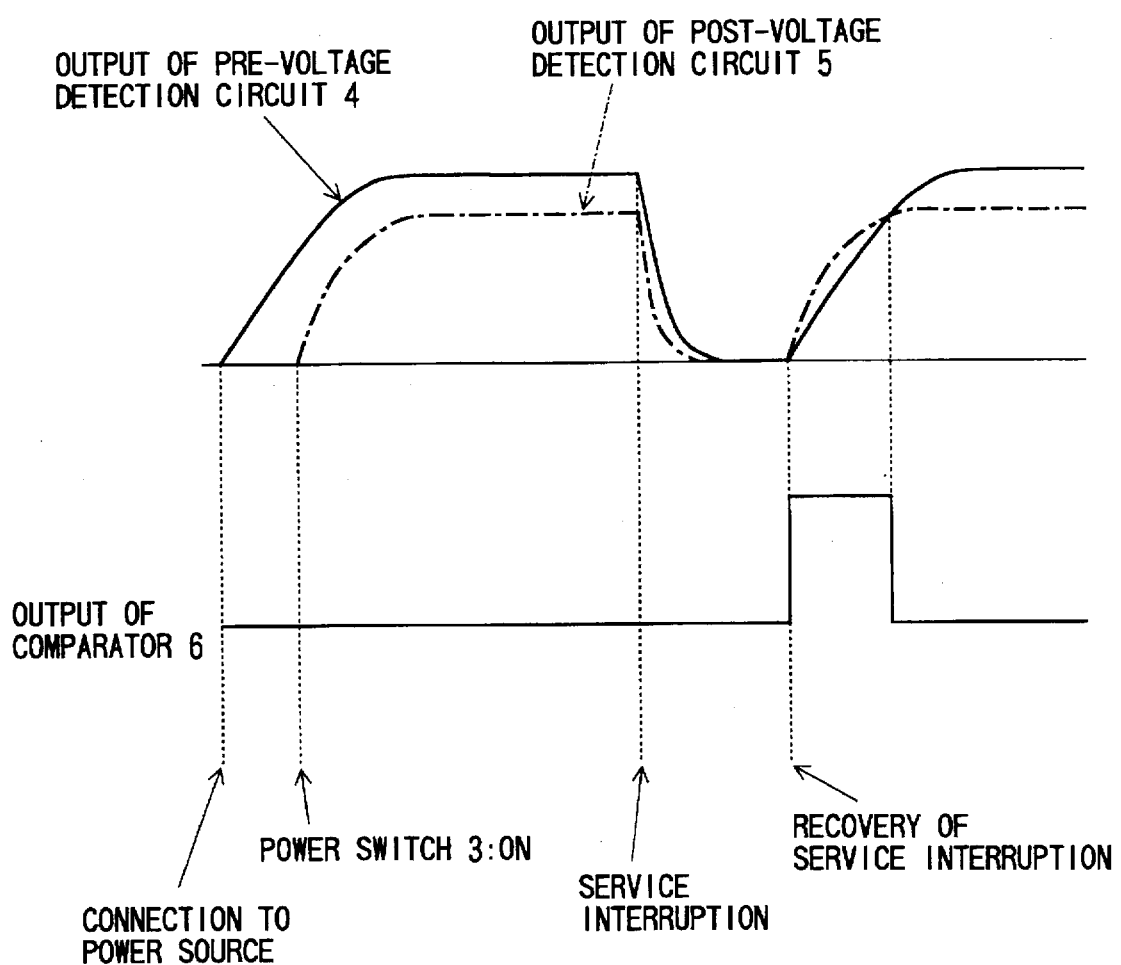
FIG. 2 is a time chart illustrating an operation of the circuit shown in FIG. 1.

Operation of the circuit shown in FIG. 1 will be described while referring to the time chart shown in FIG. 2.

Assuming that the electric equipment is connected to the power source 1 while holding the power switch 3 of the electrical equipment in OFF position, the capacitor 42 starts charging but the capacitor 52 remains uncharged. Thereafter, when the power switch 3 is turned on, the capacitor 52 starts charging following the charging of the capacitor 42. Because the capacitor 52 starts charging later than the capacitor 42, the voltage across the capacitor 52 never exceeds the voltage across the capacitor 42. As a result, the output of the comparator 6 remain at logical "0" level and the SCR 74 is not rendered conductive. The disabling circuit 7 outputs the enabling signal to the driving circuit 9, and the light emitting element 91 in the driving circuit 9 emits light onto the photo triac 8. Therefore, the photo triac 8 is rendered conductive to allow the motor 2 to be energized.

Assuming that service interruption occurs during rotation of the motor 2, electric charges charged in the capacitors 42 and 52 are discharged through discharge resistors 45 and 55, respectively, and the voltages across the capacitors 42 and 52 abruptly decrease. If the service interruption recovers after a brief period of time, the capacitors 42 and 52 start charging simultaneously assuming that the power switch 3 remains in ON state. Because the time constant of the post-voltage detection circuit 5 is smaller than that of the pre-voltage detection circuit 4, the voltage across the capacitor 52 exceeds the voltage across the capacitor 42 during a transit period of time just after the recovery of the service interruption. This changes the output of the comparator 6 to logical "1" level, thereby rendering the SCR 74 conductive. When the SCR 74 becomes conductive, the light emitting element 72 emits light and the light receiving element 73 outputs the disabling signal to the driving circuit 9. No light is emitted from the light emitting element 91 when the disabling signal is output from the disabling circuit 7 because the light emitting element 91 is shorted-circuited by the light receiving element 73. Therefore, the photo triac 8 is rendered non-conductive and hence the motor 2 is not energized.

Because the SCR 74 is self-held by the capacitor 52, the SCR 74 will not be rendered non-conductive even if the output of the comparator 6 becomes logical level "0" or the power source voltage decrease. As such, the motor 2 is prevented from being re-powered.

In order to energize the motor 2 under such a condition, the power switch 3 is turned off and is again turned on after the electrical charges in the capacitor 52 are discharged. When the duration of the service interruption is very short, the capacitors 42 and 52 are not fully discharged during such a short period of time and therefore the output of the comparator 6 does not become logical "1" level. Therefore, the motor 2 does not stop its rotation.

The Zener diodes 43 and 53 are selected so that the Zener voltage of the Zener diode 43 is greater than that of the Zener diode 53. This prevents the voltage across the capacitor 52 from accidentally exceeding the voltage across the capacitor 42 under the normally operating condition. If this unwanted condition should occur, the output of the comparator 6 is changed from the logical "0" level to the logical "1" level in the normal condition, causing to stop the rotation of the motor 2.

As described above, while the present invention is particularly useful as a re-powering prevention device for preventing re-powering of the electrical equipment after recovery of service interruption, the present invention can be used as a general security device which does not actuate the electrical equipment if the electrical equipment is connected to the power source with the power switch being in ON position.

While only one exemplary embodiment of this invention has been described in detail, those skilled in the art will recognize that there are many possible modifications and variations which may be made in this exemplary embodiment while yet retaining many of the novel features and advantages of the invention. Accordingly, all such modifications and variations are intended to be included within the scope of the appended claims.

What is claimed is:

1. A security device for electrical equipment having a power switch, the electrical equipment being connected to a power source in use, said device comprising:

a first voltage detection circuit, operable under a first condition when the electrical equipment is supplied with power from the power source, for detecting a voltage of the power source and outputting a first detection voltage;

a second voltage detection circuit, operable under a second condition when the electrical equipment is supplied with power from the power source and when the power switch is turned on to allow the electrical equipment to be powered by the power source, for detecting a voltage of the power source and outputting a second detection voltage;

a comparator connected to said first voltage detection circuit to receive the first detection voltage and also connected to said second voltage detection circuit to receive the second detection voltage, said comparator comparing the first detection voltage with the second detection voltage and outputting a comparison result, said comparison result differing depending on whether said power source is operating under a normal powering condition or whether power has been restored following a power disruption while said power switch is in a closed position; and control means for controlling the electrical equipment so as not to be powered by the power source in response to the comparison result obtained after power has been restored following a power disruption while said power switch is in a closed position.

2. A security device according to claim 1, wherein the comparison result is a binary signal having a first level and a second level wherein the comparison result takes the first level during said normal powering condition and the second level when power has been restored after the interruption of power supply while said power switch is in a closed position.

3. A security device according to claim 2, wherein said first voltage detection circuit comprises a first integrating circuit consisting of a first resistor and a first capacitor connected in series across the power source, said first integrating circuit having a first time constant, and said second voltage detection circuit comprises a second integrating circuit consisting of a second resistor and a second capacitor connected in series across the power source, said second integrating circuit having a second time constant smaller than the first time constant, and wherein said first voltage detection circuit outputs a voltage across the first capacitor as the first detection voltage, and said second voltage detection circuit outputs a voltage across the second capacitor as the second detection voltage.

4. A security device according to claim 3, wherein said first voltage detection circuit further comprises a third resistor connected across the first capacitor and wherein said second voltage detection circuit further comprises a fourth resistor connected across the second capacitor.

5. A security device according to claim 4, wherein said control means comprises:

an SCR having a gate connected to said comparator to receive the comparison result and being rendered conductive in response to the comparison result with the second level;

a first light emitting element connected in series with said SCR and emitting light when said SCR is rendered conductive;

a first light receiving element to receive the light from said first light emitting element;

a second light emitting element being short-circuited by said first light receiving element when said first light receiving element receives the light from said first light emitting element; and a photo-triac connected in series to the power switch and being rendered non-conductive when said second light emitting element is short-circuited.

6. A security device according to claim 5, wherein said second capacitor is connected to said SCR.

7. A security device according to claim 6, further comprising a first Zener diode connected across said first capacitor and a second Zener diode connected across said second capacitor, wherein the first Zener diode has a first Zener voltage and a second Zener diode has a second Zener voltage small than the first Zener voltage.

8. A security device for electrical equipment having a power switch, the electrical equipment being connected to a power source in use, said device comprising:

a first status detection circuit for detecting a first status in which the electrical equipment is supplied with power from the power source, and outputting a first detection signal indicative of the first status;

a second status detection circuit for detecting a second status in which the electrical equipment is supplied with power from the power source and the power switch is turned on to allow the electrical equipment to be powered by the power source, and outputting a second detection signal indicative of the second status; and switching means connected in series to the electrical equipment, said switching means being selectively rendered ON or OFF according to a combination of the first detection signal and the second detection signal, wherein said switching means is rendered OFF when the first detection signal and the second detection signal have a combination of outputs which indicates that power has been restored following a power disruption while said power switch is in a closed position.

9. A switching device according to claim 8, wherein said switching means is rendered ON when the second detection signal is output following the first detection signal.

* * * * *